(12) United States Patent
Chen

(10) Patent No.: US 12,291,375 B2
(45) Date of Patent: May 6, 2025

(54) HANGING STORAGE BASKET

(71) Applicant: Shenzhen Chengxingshun Industrial Co., Ltd., Shenzhen (CN)

(72) Inventor: Mengting Chen, Xingning (CN)

(73) Assignee: Shenzhen Chengxingshun Industrial Co., Ltd., Shenzhen (CN)

( * ) Notice: Subject to any disclaimer, the term of this patent is extended or adjusted under 35 U.S.C. 154(b) by 0 days.

(21) Appl. No.: 18/368,167

(22) Filed: Sep. 14, 2023

(65) Prior Publication Data
US 2025/0066076 A1    Feb. 27, 2025

(30) Foreign Application Priority Data

Aug. 26, 2023   (CN) .......................... 202322307505.X

(51) Int. Cl.
| | |
|---|---|
| *B65D 1/38* | (2006.01) |
| *B65D 6/08* | (2006.01) |
| *B65D 21/08* | (2006.01) |
| *B65D 25/22* | (2006.01) |
| *F16M 13/02* | (2006.01) |

(52) U.S. Cl.
CPC .............. *B65D 21/08* (2013.01); *B65D 1/38* (2013.01); *B65D 7/20* (2013.01); *B65D 21/086* (2013.01); *B65D 25/22* (2013.01); *F16M 13/02* (2013.01)

(58) Field of Classification Search
CPC ........ B65D 21/08; B65D 21/086; B65D 7/20; B65D 25/22; B65D 1/38; F16M 13/02; A47F 5/01
USPC ............................................ D3/306; D6/513
See application file for complete search history.

(56) References Cited

U.S. PATENT DOCUMENTS

| | | | | |
|---|---|---|---|---|
| 4,456,125 | A | * 6/1984 | Chap ........................ | B65D 7/14 206/513 |
| D305,272 | S | * 12/1989 | Remmers ....................... | D6/513 |
| 4,944,434 | A | * 7/1990 | Hamilton .................. | B60R 9/02 224/571 |
| 5,036,990 | A | * 8/1991 | Verchere ............... | A47F 5/0068 211/113 |
| 5,048,222 | A | * 9/1991 | Correll ................... | A01K 80/00 43/104 |
| 5,857,226 | A | * 1/1999 | Sommer ................... | E04H 4/14 297/254 |
| 5,931,316 | A | * 8/1999 | Carpinelli ................. | A47F 7/14 108/26 |

(Continued)

OTHER PUBLICATIONS

Under Shelf Storage sold on Amazon, URL: https://www.amazon.com/AmonHouseware-Hanging-Adjustable-Organizer-Bookshelf/dp/B0BY2ZGN7S/ref=sr_1_12?crid=36XRHGFSX171B&keywords=under%2Bshelf%2Bbasket&qid=1691745658&sprefix=%2Caps%2C452&sr=8-12&th=1. (Downloaded on Sep. 14, 2023).

*Primary Examiner* — Nathan J Jenness
*Assistant Examiner* — Jennifer Castriotta

(57) ABSTRACT

A hanging storage basket includes a basket, suspension components, regulating screws and thumb screws. The suspension components are connected to the basket via regulating screws, and there is a hanging space between the suspension components and a basket top. The regulating screws are used to adjust a height of hanging space. A suspension component consists of a hanging component and a regulating component. There is a bar-shaped regulating groove on the regulating component, and first screw hole on top front side of the basket. each regulating screw inserts a respective bar-shaped regulating groove into a corresponding first screw hole to fasten.

7 Claims, 4 Drawing Sheets

(56) References Cited

U.S. PATENT DOCUMENTS

| | | | | |
|---|---|---|---|---|
| 8,025,172 B1 * | 9/2011 | Zink | ............................ | E04H 4/14 |
| | | | | 220/756 |
| D710,124 S * | 8/2014 | Goodman | ........................ | D6/513 |
| 9,212,497 B2 * | 12/2015 | Chlapaty | .................. | A47C 4/286 |
| 9,648,953 B1 * | 5/2017 | Kuo | ............................ | A47F 5/01 |
| 9,861,200 B2 * | 1/2018 | Lim | ........................ | A47B 96/07 |
| D938,728 S * | 12/2021 | Xin | ................................ | D3/306 |
| D970,222 S * | 11/2022 | Zheng | ............................ | D6/513 |

* cited by examiner

HANGING STORAGE BASKET

FIELD OF THE INVENTION

The utility patent relates to the technical field of storage basket, in particular to a hanging storage basket.

BACKGROUND OF THE INVENTION

There are so many different kinds of small items in modern family that various types of storage baskets emerge on the market. Some existing hanging storage baskets are usually fixed to tables by glues or screws, once installed, it's difficult to remove the storage basket, and it is inconvenient for users to move the storage basket according to demand. Also, some existing hanging storage racks are hung on hooks to hold items, and hooks are often welded to storage racks, which is unadjustable according to the thickness of assembly items. Therefore, there needs an improvement.

DETAILED DESCRIPTION

Aiming at the defects and deficiencies of the prior art, the utility patent provides a hanging storage basket, which has the following advantages: the hanging storage basket is simple in structure and the user can adjust the height of the hanging space according to the height of outside assembly parts to make the hanging storage basket capable of suspending on outside assembly parts with different height.

To realize the above purposes, the utility patent adopts the following technical proposal: a hanging storage basket, comprising a containable basket characterized in that the storage basket comprised of an adjustable suspension component on the basket, between the suspension component and the basket, there is a hanging space for outside assembly parts to inset; and a regulating screw arranged on the basket and the suspension component which can be used to adjusting height of hanging space.

The suspension component comprises of a hanging component set on the top of the basket and a regulating component, which is paralleled to the side wall of the basket and capable of adjusting the distance of the hanging component and the basket in conjunction with the regulating screw.

There is a bar-shaped regulating groove arranged at the regulating component and a screw hole on the basket side wall. One end side of the regulating component is engaged with the first screw hole, threading through the bar-shaped regulating groove while the other end side is limited in the thumb screw outside the bar-shaped regulating groove.

The basket is made the baseboard, the first side panel and the second side panel, symmetrically arranged at both edges of the the baseboard; and the third side panel, arranged between the first side panel and the second side panel and connected to one edge of the baseboard. The described accommodation space is provided with the baseboard, the first side panel, the second side panel and the third side panel.

One side of the basket away from the third side panel is provided with an opening connects to the accommodation space; The first screw holes are set symmetrically on the first side panel and second side panel on both sides of the opening edge; The suspension components consist of two symmetric pieces, the first suspension component and second suspension component; The first thumb screw goes through the bar-shaped regulating groove and connects to the first screw hole. The hanging space is arranged between the hanging component of the first suspension component and the top of the first side panel and between the hanging component of the second suspension component and the top of the second side panel.

A fixing portion is arranged on both sides of the third side panel and is provided with a strip fixing hole; A Second screw hole is arranged on the one side of the first side panel and the second side panel away from the first screw hole; The storage basket also consists of a second thumb screw that one end goes through the strip fixing hole and closely bound with the second threaded hole.

The hanging storage basket comprises the demountable fixed components assembled on the third side panel and capable of locking the third side panel to eternal assembly items.

A hanging hole is arranged on the third side panel near the top edge; The fixed components comprises of a fixed piece, hook parts arranged on one side of the fixed piece and capable of penetrating the hanging hole for supporting the third side panel; and an adhesive layer arranged on one side of the fixed piece away from the hook parts for fixing to an eternal assembly items.

The suspension component is in ¬-shape.

After adopting the technical proposal, the utility patent has the following beneficial effects: a hanging storage basket comprises a basket, a suspension component and a regulating screw, wherein the basket comprises of an accommodation space and the adjustable suspension component arranged on the basket, between the suspension component and the basket, there is a hanging space for outside assembly parts to inset; and a regulating screw arranged on the basket and the suspension component which can be used to adjust height of hanging space. It should be noted that it is convenient for users to adjust the height of the hanging space according to the height of assembly items or the height of items in the accommodation space of the basket by setting the suspension component and the regulating screw. The hanging storage basket can be suspended on assembly items of different height or hang higher items on the assembly items.

DESCRIPTION OF THE DRAWINGS

To more clearly explain the technical proposal of the embodiments of the utility patent or the prior art, the drawings required for the description of the embodiments or the prior art are briefly introduced. It is obvious that the drawings below are only for some embodiments of the utility patent. The ordinary technicians in the field can also obtain other drawings from these drawings without creative labor.

DESCRIPTION OF REFERENCE SIGNS IN THE DRAWINGS

1. Basket; 11. Baseboard; 12. The first side panel; 13. The second side panel; 14. The third side panel; 141. Fixing portion; a. The second screw hole; b. Strip fixing hole; 2. The second thumb screw; 3. Suspension component; 31. Hanging component; 32. Regulating component; 4. Regulating screw; c. Bar-shaped regulating groove; d. Hanging space; e. The first screw hole; 5. Fixed components; 51. Fixed piece; 52. Hook parts; 53. Adhesive layer.

Detailed Description of the Preferred Embodiments

The utility patent is further described in detail in combination with the drawings.

The embodiment is only the interpretation of the utility patent, but not a limitation to the utility patent. The technicians in the field can make modifications without creative contributions to the embodiment as required after reading the specification, and such modifications within the scope of the claims of the utility patent are protected by the patent law.

Figure 1:
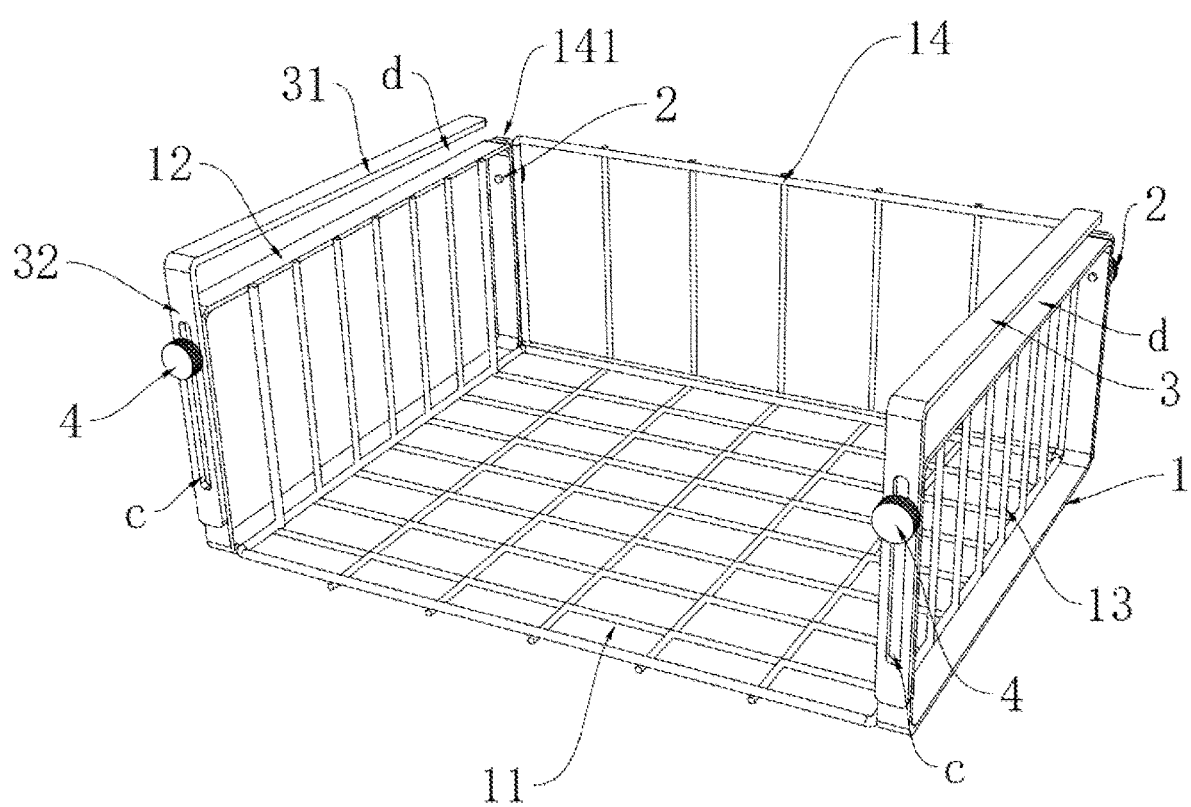
FIG. 1 is the structural diagram of the utility patent.
Figure 2:
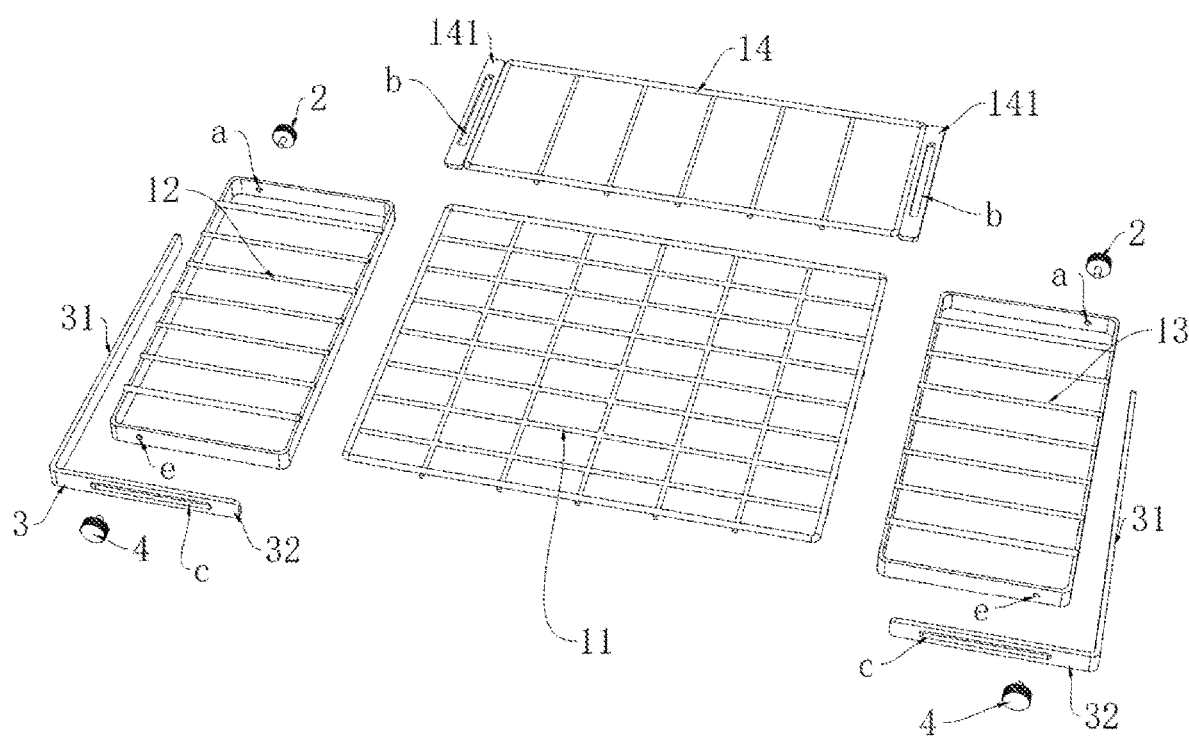
FIG. 2 is the explosive view of the utility patent.

The embodiment relates to a hanging storage basket as shown in FIGS. 1 and 2, which comprises of a basket 1, a suspension component 3 and a regulating screw 4.

The basket 1 comprises of an accommodation space and an adjustable suspension component 3 arranged on the basket, between the suspension component 3 and the basket 1, there is a hanging space d for outside assembly parts to inset; A regulating screw 4 is arranged on the basket 1 and the suspension component 3 which can be used to adjust height of hanging space d. It should be noted that it is convenient for users to adjust the height of the hanging space d according to the height of assembly items or the height of items in the accommodation space of the basket 1 by setting the suspension component 3 and the regulating screw 4. The hanging storage basket can be suspended on assembly items of different height or hang higher items on the assembly items. The assembly items are cabinets, tables and so on.

Preferably, suspension component 3 is provided with hanging component 31 and regulating component 32. The hanging component 31 is arranged on the top of the basket 1. The regulating component 32 is arranged parallel to the side wall of basket 1, formed in one body with hanging component 31, and one end of the regulating component 32 is connected with one end of the hanging component 31. The regulating component 32 is used to adjust the distance between hanging component 31 and basket 1 working with regulating screw 4, so that users can adjust the height of hanging space d and insert the assembly items of different height to make the storage basket hang on the assembly items. In this embodiment, the suspension piece 3 is in ¬-shape.

Preferably, in order to make the the regulating screw 4 adjust the suspension component 3, there is a bar-shaped regulating groove c arranged at the regulating component 32 and the first screw hole e on the basket 1 side wall. One end side of the regulating screw 4 is engaged with the first screw hole e, threading through the bar-shaped regulating groove c while the other end side is limited in the thumb screw outside the bar-shaped regulating groove c. Optionally, to make the hanging storage basket install on the assembly items stably, the third screw hole is arranged on the hanging component 31 away from regulating component 32 and engaged with a fastening screw that is a thumb screw.

Preferably, to make the basket 1 carry items, the basket 1 includes: a baseboard 11, the first side panel 12, the second side panel 13 and the third side panel 14. The first side panel 12 and the second side panel 13 are symmetrically arranged on both sides of the baseboard 11. The third side panel 14 is arranged between the first side panel 12 and the second side panel 13 and connected to one edge of the baseboard 11. The described accommodation space is provided with the baseboard 11, the first side panel 12, the second side panel 13 and the third side panel 14.

In some embodiments, the first side panel 12 and the second side panel 13 are welded to the edges of both sides of the baseboard 11 respectively.

In some embodiments, for the convenience of storage of the storage basket, the first side panel 12 and the second side panel 13 are hinged with the baseboard 11 respectively. Several parallel rectangular holes are arranged on the first side panel 12, the second side panel 13 and the third side panel 14 at intervals. The baseboard 11 is in grip-shape. In other embodiments, the baseboard 11 is in tabular shape, the first side panel 12, the second side panel 13 and the third side panel 14 are in grip or tabular shape.

Preferably, one side of the basket 1 away from the third side panel 14 is provided with an opening connects to the accommodation space; The first screw holes e are set symmetrically on the first side panel 12 and the second side panel 13 on both sides of the opening edge; The suspension components 3 consist of two symmetric pieces, the first suspension component 3 and the second suspension component 3; The first thumb screw goes through the bar-shaped regulating groove c and connects to the first screw hole e. The hanging space d is arranged between the hanging component 31 of the first suspension component 3 and the top of the first side panel 12 and between the hanging component 31 of the second suspension component 3 and the top of the second side panel 13. Optionally, a non-slip pattern is arranged on the bottom of hanging component 31 of the suspension component 3 to make the assembly between the storage basket and the assembly items more stable. Optionally, anti-slip coating is set on the bottom of the hanging component 31 of the suspension component 3 with the non-slip pattern on the bottom of the anti-slip coating.

Optionally, the third side panel 14 is formed or welded together with the baseboard 11, the first side panel 12 and the second side panel 13 respectively.

Figure 3:
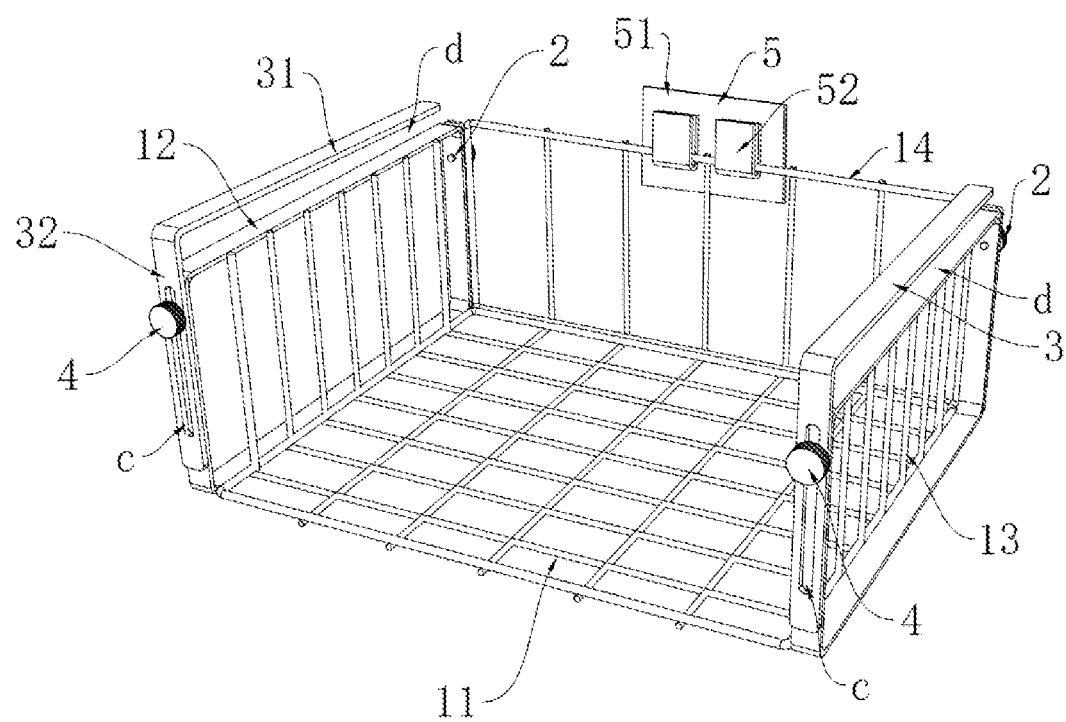
FIG. 3 is the structural diagram of fixed components and the third side panel.
Figure 4:
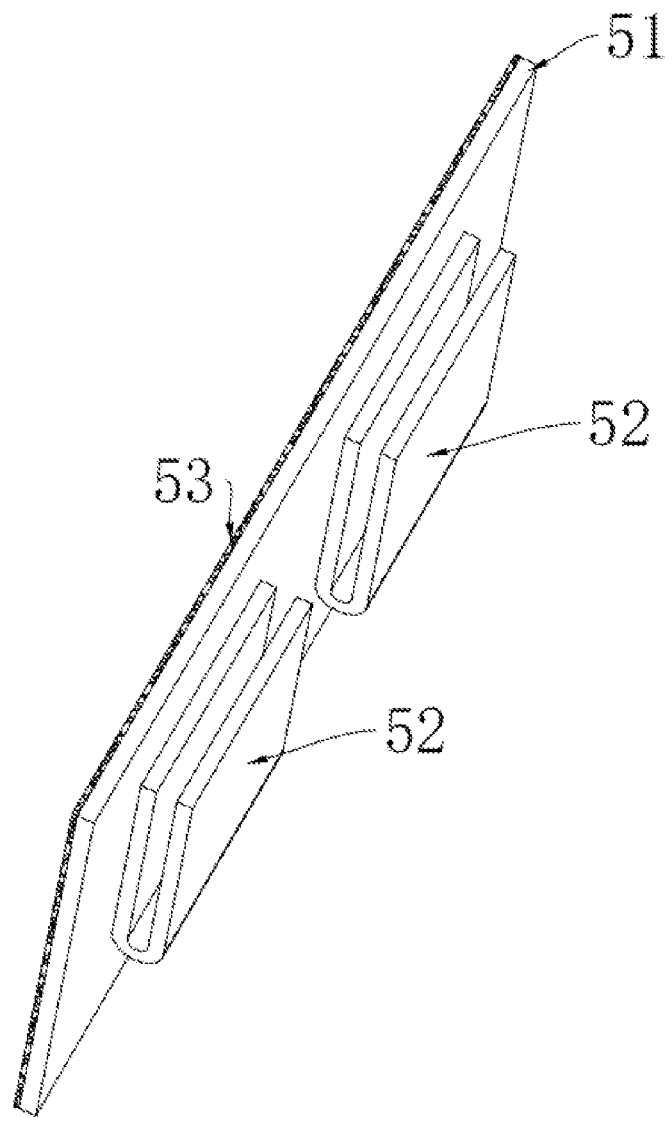
FIG. 4 is the structural diagram of the fixed components.

Optionally, to make the hanging of the storage basket more stable, as shown in FIG. 3-4, the third side panel 14 is glibly assembled on the basket 1, and a fixing portion 141 with plate-shape is arranged on both sides of the third side panel 14 and is fixedly connected and welded with the third side panel 14. A strip fixing hole b is set on the fixing portion 141 and the second screw hole a is arranged on one side of the first side panel 12 and the second side panel 13 away from the first screw hole e. The storage basket also comprises the second thumb screw 2 that one end threading through the strip fixing hole b, engaged with the second screw hole a and the demountable fixed components 5 that is assembled on the third side panel 14 and capable of locking the third side panel 14 to eternal assembly items. A hanging hole is arranged on the side of the third side panel 14 near the top edge. Fixed components 5 contains a fixed piece 51, hook parts 52 and an adhesive layer 53. The hook parts 52 are arranged on one side of the fixed portion 51 and used to support the third side panel 14 by going through the hanging hole. The adhesive layer 53 is arranged on one side of the fixed piece 51 away from the hook parts 52, and used to fix with eternal assembly items. In this embodiment, the adhesive layer 53 is coated with a protective film. In other embodiments, the fixed components 5 are hooks that connected to the third side panel 14 fixedly and capable of hanging eternal assembly items.

For example, users can make the head of the thumb screw loosen the pressure on the regulating component 32 of the suspension component 3 by rotating the first thumb screw and then adjust the suspension component 3 to make the regulating component 32 slide up and down relative to the thumb screw so that the hanging space d reaches the needed height. Then tightening the hanging screw and moving the hanging storage basket so that the eternal assembly items (such as tables, cabinets cavity bottom) are inserted into the hanging space d, thereby hanging eternal assembly items. In order to make storage basket hanging more stable, users can adjust the height of the third side panel 14 by the second thumb screw 2 and the strip fixing hole b, then hang the hook parts 52 of the fixed components 5 through the hanging hole and the third side panel 14 and make full use of the free space on the bottom of tables by the adhesive layer 53 to fix on the eternal assembly items (such as the bottom of the table, cabinet or wall). When It is necessary to take things, users can take directly from the opening of the first side panel 12 and the second side panel 13 or pull out the hanging storage basket from the opening at the top of the basket 1.

The above is only used to describe the technical proposal of the utility patent and not to limit it, and other modifications or equivalent replacements made by the ordinary technicians in the field to the technical proposal of the utility patent should be covered in the scope of claims of the utility patent as long as they do not deviate from the spirit and scope of the technical proposal of the utility patent.

The invention claimed is:

1. A hanging storage basket, comprising a basket, suspension components and regulating screws; wherein the suspension components are removably fastened to a respective one of two sides of the basket via corresponding regulating screws; and the basket is attachable to an external assembly item via the suspension components to form a space, and a height of the space is adjusted via the regulating screws; each suspension component further comprises a hanging component and a regulating component; wherein each suspension component is integrally formed by one hanging component and one regulating component; and each hanging component is parallelly set above a respective top side edge of the basket; each regulating component is fixedly connected to a respective front side edge of the basket via a corresponding regulating screw.

2. The hanging storage basket according to claim 1, wherein a bar-shaped regulating groove is arranged in the regulating component; and first screw holes are set on a top front end of the basket; wherein each regulating screw goes through a respective bar-shaped regulating groove to enter into a corresponding first screw hole and fasten the suspension component to the basket.

3. The hanging storage basket according to claim 2, wherein the basket further comprises a baseboard, a first side panel, a second side panel, a third side panel; wherein the first side panel and the second side panel are symmetrically arranged on right and left side edges of the baseboard; and the third side panel is arranged between the first side panel and the second side panel and connected to a rear edge of the baseboard; the first side panel, the second side panel;

and the third side panel, and the baseboard together form a storage space of the basket.

4. The hanging storage basket according to claim 3, comprises two suspension components that are symmetrically connected to respective front side edges of the basket, wherein a first suspension component is connected to the first side panel, and a second suspension component is connected to the second side panel; the first side panel and second side panel each have a respective first screw hole; a first thumb screw goes through a respective bar-shaped regulating groove and enters into the first screw hole to fasten the first suspension component to the basket.

5. The hanging storage basket according to claim 4, wherein fixing portions are separately arranged on two sides of the third side panel;

and a strip fixing hole is provided on each fixing portion; a second screw hole is arranged on rear sides of both the first side panel and the second side panel; wherein the hanging storage basket also comprises second thumb screws which go through respective strip fixing holes and closely bind with corresponding second screw holes to fasten the first side panel, second side panel and third side panel forming the basket.

6. The hanging storage basket according to claim 5, further comprising one fixed component which is demountably connected on the third side panel; wherein the third side panel is affixed to the external assembly item via the fixed component.

7. The hanging storage basket according to claim 6, wherein a hanging hole is arranged on a top edge of the third side panel; and the fixed component further comprises a fixed piece, two hook parts and an adhesive layer; and the two hook parts are arranged on a front side of the fixed piece; and the adhesive layer is arranged on a rear side of the fixed piece to stick to the external assembly item.

* * * * *